United States Patent [19]

Speranza et al.

[11] Patent Number: 5,341,700
[45] Date of Patent: Aug. 30, 1994

[54] X-Y MOVEMENT MECHANISM

[75] Inventors: Richard J. Speranza, Jeannette; Richard A. Speranza, Export, both of Pa.

[73] Assignee: Speranza Specialty Machining, Export, Pa.

[21] Appl. No.: 992,170

[22] Filed: Dec. 17, 1992

[51] Int. Cl.$^5$ .................... G05G 11/00; F16C 33/00
[52] U.S. Cl. ................. 74/479 MF; 108/143; 248/184; 384/42
[58] Field of Search ..... 74/479 M, 479 MF, 479 ML, 74/479 MM; 108/20, 137, 143; 33/1 M; 248/184, 661; 269/71, 73; 359/393; 414/749; 384/7, 17, 20, 26, 42

[56] References Cited

U.S. PATENT DOCUMENTS

| | | | |
|---|---|---|---|
| 3,326,032 | 6/1967 | Stuhldreher | 384/42 X |
| 3,813,132 | 5/1974 | Sahm | 384/42 |
| 4,113,223 | 9/1978 | Kakizaki | 248/184 X |
| 4,189,953 | 2/1980 | Volk | 74/479 |
| 4,191,367 | 3/1980 | Speiser et al. | 384/42 X |
| 4,193,317 | 3/1980 | Oono et al. | 74/479 |
| 4,270,404 | 6/1981 | Murakoshi et al. | 74/479 |
| 4,341,128 | 7/1982 | Murakoshi et al. | 74/479 |
| 4,372,223 | 2/1983 | Iwatani | 108/143 |
| 4,409,860 | 10/1983 | Moriyama et al. | 74/479 |
| 4,609,264 | 9/1986 | Podvin et al. | 108/137 X |
| 4,628,756 | 12/1986 | Kimura et al. | 74/479 |
| 4,648,723 | 3/1987 | Sugiyama et al. | 384/9 |
| 4,729,536 | 3/1988 | Scala | 248/429 |
| 4,972,574 | 11/1990 | Isono et al. | 29/740 |
| 4,978,233 | 12/1990 | Stotzel et al. | 384/12 |
| 5,040,431 | 8/1991 | Sakino et al. | 74/479 |
| 5,115,354 | 5/1992 | Iwase | 359/873 |

FOREIGN PATENT DOCUMENTS

| | | | |
|---|---|---|---|
| 2-24032 | 1/1990 | Japan | 108/143 |
| 433298 | 6/1974 | U.S.S.R. | 384/17 |

Primary Examiner—Leslie A. Braun
Assistant Examiner—David W. Laub
Attorney, Agent, or Firm—James L. Sherman

[57] ABSTRACT

An X-Y movement mechanism includes a fixed base having a first surface and a movable member having a second surface. The movable member is disposed for movement relative to the fixed base with the second surface being parallel with and facing toward the first surface. At least a first groove in the first surface extends in an X direction and a second groove in the second surface extends in a Y direction. The X direction is different from and at an angle with respect to the Y direction and both are parallel to the first surface and to the second surface. The first and second grooves respectively have overlying regions when the movable member is disposed for movement relative to the fixed base. An X-Y guide element has a first half and a second half. The first half is disposed in the first groove for sliding, non-rotating relative movement therebetween in the X direction. The second half is disposed in the second groove for sliding, non-rotating relative movement therebetween in the Y direction. The first and second halves include portions thereof disposed within the overlying regions of the first and second grooves. The movable member is capable of movement in the X direction as the first half of the X-Y guide element moves in the X direction along the first groove and in the Y direction as the second groove moves in the Y direction on the second half of the X-Y guide element.

24 Claims, 5 Drawing Sheets

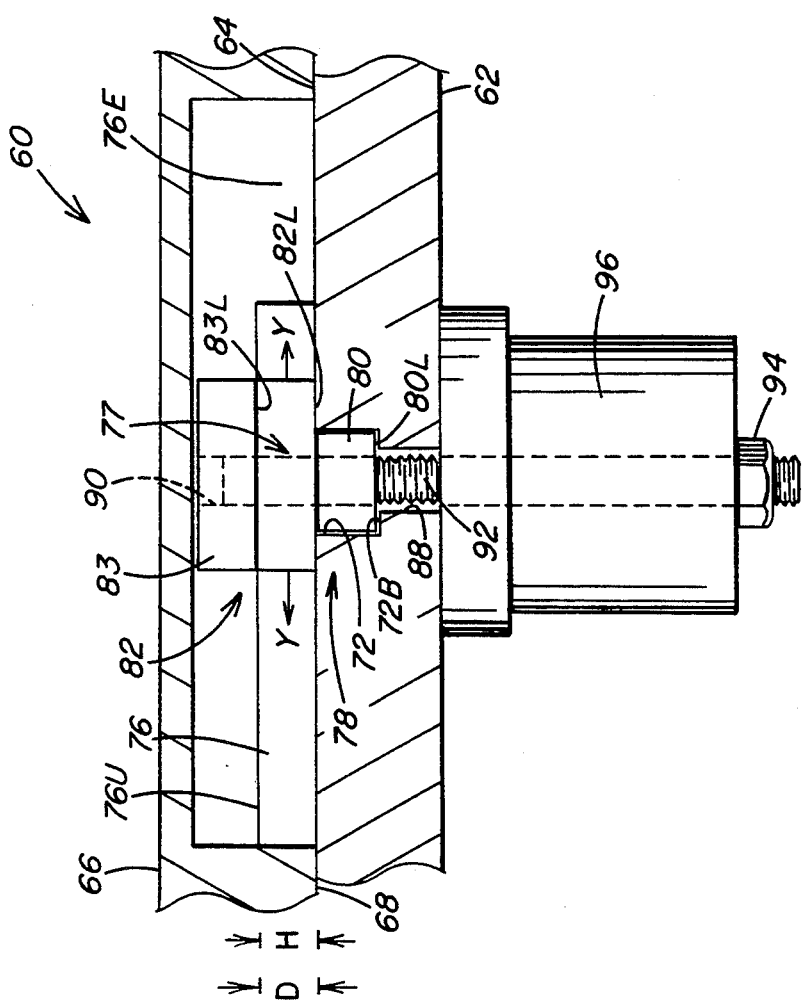
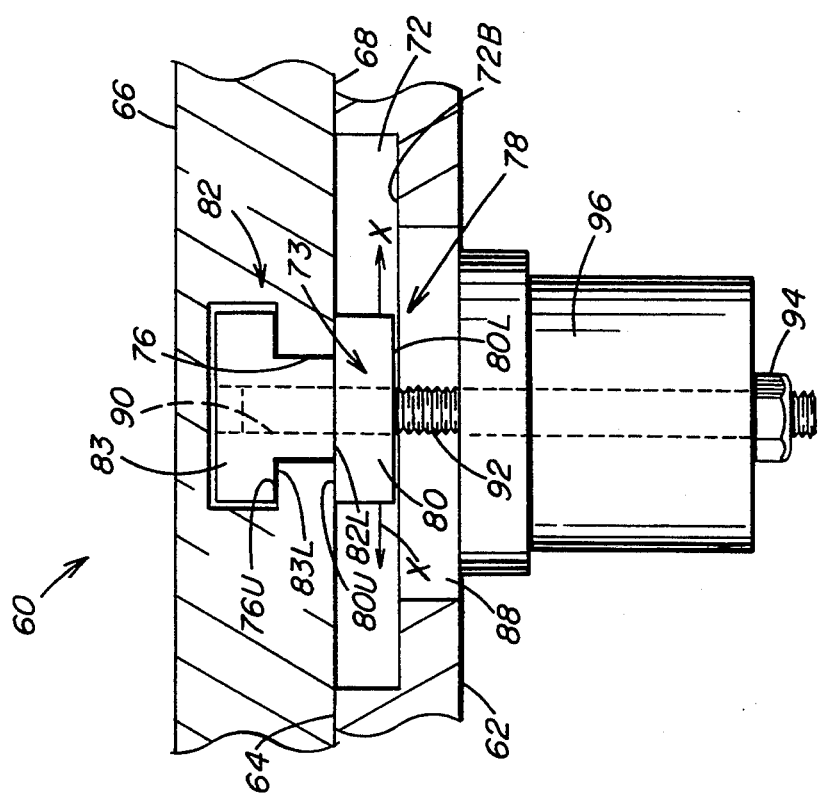
FIG. 4
FIG. 3

X-Y MOVEMENT MECHANISM

BACKGROUND OF THE INVENTION

1. Field of the Invention

This invention relates to a X-Y movement mechanism and, more specifically, to such a movement mechanism which has a low profile which enables a movable member to be mounted directly on a fixed base in a manner which allows X-Y guide means to be generally confined therebetween.

2. Description of the Prior Art

There are in the prior art a number of devices capable of supporting a movable member for movement in an X and/or Y direction relative to a fixed base. Although these devices include features which may be attractive or desirable for various uses, the devices are typically configured to provide satisfactory results depending on the particular purpose for which and environment in which they are primarily intended.

For example, U.S. Pat. Nos. 4,189,953; 4,372,223; 4,409,860; 4,628,756; 4,972,574; and 5,115,354 disclose fixed base elements having channel or rail means for guided movement of an intermediate member and a top member thereon in a first direction. The intermediate member in turn includes some form of channel or rail means for support of the top member to facilitate separate movement of the top member in a second direction.

U.S. Pat. No. 4,729,536 includes a similar configuration of a base, intermediate and top member which employs rods rather than channel or rail guide means as employed in the devices discussed hereinabove.

Similarly, U.S. Pat. No. 5,040,431 discloses a movement guiding mechanism which primarily relies upon hydrostatic gas or air bearing mounting pads in a similar arrangement of base, intermediate and top members thereof. U.S. Pat. No. 4,978,233 discloses a different hydrostatic bearing assembly which is utilized for the control of movement in one direction only.

On the other hand, U.S. Pat. No. 4,648,723 discloses a movable stage portion disposed between two movable guides. The first guide moves in an X-direction and the second guide moves in the Y-direction for the selective positioning of the stage portion disposed therebetween in the X and/or Y directions.

U.S. Pat. No. 4,270,404 discloses a block which is disposed for movement on a flat base plate. The block is driven in the X direction and/or Y direction by a relatively complicated means including the selective rotation of a pair of side-by-side screws that drive helical gears which operatively engage helical racks on the block. In a similar manner, the device disclosed in U.S. Pat. No. 4,341,128 employs a pair of screws disposed one above the other. In alternative embodiments, the movable stage can be located between or above or below the screws for movement in the X direction and/or Y direction by the selective rotation of the screws.

U.S. Pat. No. 4,193,317 discloses a more complicated fine position control device which may use a laser beam for recording output information of a computer.

While all of the devices disclosed hereinabove may be appropriate for the particular purpose and environment in which they are intended, there remains a need for any X-Y movement mechanism, which is simple and reliable and provides an overall configuration having a relatively low profile, for the proper control of a movable member in an X direction and/or Y direction relative to a fixed base. Some of the prior art devices disclosed hereinabove include rail guide means which are not capable of withstanding severe lateral force or pressure and are exposed to and susceptible to damage from the environment. Others include relatively light rod means or sensitive bearing pads which might also be damaged by the environment and incapable of withstanding significant lateral forces. Still others include screw and gearing means which are relatively complicated and could be difficult to properly maintain.

On the other hand, there remains a need for the utilization of an X-Y movement mechanism in various heavy-duty machines such as that disclosed in a patent application entitled "Portable Vertical Boring Machine", which was filed on the same date as the present application by the same inventor and has been assigned to the same assignee. The invention disclosed therein is directed to a portable vertical boring machine which is capable of boring and/or facing a circular region of large circular components or other work pieces which have central axes which are disposed vertically during the boring and/or facing process. The particular machine disclosed therein includes means for mounting the large circular component in a fixed horizontal position with the central axis extending in a vertical direction. The machine includes tool support extending generally vertically for rotation about the central axis. The machine also includes a configuration for moving the tool support in the X and Y directions in the horizontal plane relative to the fixed component to insure alignment of the tool support, and the axis of rotation thereof, with the central axis. The configuration for moving the tool support in the X and Y direction is a specific embodiment of the invention which is the subject of the present application.

While the particular portable vertical boring machine of the co-pending application filed on the same date as the present application represents a specific application of the present invention, it should be understood that many other applications may exist in the machining art or similar arts for an X-Y movement mechanism for the control movement of a member on a fixed base which is relatively simple to provide and easy to maintain. Further, because of the forces required in such machines, it is appropriate to include an overall configuration with the movable member being directly mounted on the fixed base to provide an overall low profile for the mechanism. Additionally, because of the environment in which such heavy machinery is employed, which environment could include metal shavings or chips, it is appropriate for the overall configuration to include means for insuring that the X-Y movement mechanism will not be subjected to such metal chips, shavings, or other extraneous material which could interfere with the overall operation of the mechanism. While the portable vertical boring machine of the co-pending application represents one use of such an X-Y movement mechanism, the introduction of such a mechanism having the preferred overall features will result in its use in any number of other machines or devices to improve the operation and reliability thereof.

SUMMARY OF THE INVENTION

It is therefore an object of the invention to provide an X-Y movement mechanism for the controlled movement of a member on a fixed base which is relatively simple to provide and easy to maintain.

It is a further object to provide such a mechanism which includes a low profile for the relatively close disposition of the movable member on the fixed base.

It is yet another object to provide a preferred mechanism of the type described which includes the fixed base having an upper planar surface and the movable member having a lower planar surface which planar surfaces are in sliding contact during the relative movement of the movable member on the fixed base.

It is still another object to provide the mechanism of the type described in which an X-Y guide mechanism disposed between the upper planar surface and the lower planar surface is confined between the fixed base and the movable member to prevent it from being exposed to the environment.

These and other objects of the invention are provided in a preferred embodiment thereof including an X-Y movement mechanism including a fixed base having a first surface and a movable member having a second surface with the movable member being disposed for movement relative to the fixed base with the second surface being parallel with and facing toward the first surface. The fixed base has a first groove configuration in the first surface extending in an X direction. The movable member has a second groove configuration in the second surface extending in a Y direction. The X direction is different from and at an angle with respect to the Y direction. The X direction and the Y direction are parallel to the first surface and to the second surface. The first groove configuration and the second groove configuration respectively have overlying regions when the movable member is disposed for movement relative to the fixed base. An X-Y guide element has a first half and a second half. The first half is disposed in the first groove configuration for sliding, non-rotating relative movement therebetween in the X direction. The second half is disposed in the second groove configuration for sliding, non-rotating relative movement therebetween in the Y direction. The first half and the second half include portions thereof disposed within the overlying regions of the first and second groove configurations. The movable member is capable of movement in the X direction as the first half of the X-Y guide element moves in the X direction along the first groove configuration and in the Y direction as the second groove configuration moves in the Y direction on the second half of the X-Y guide element.

In the preferred X-Y movement mechanism, the X direction is perpendicular to the Y direction. The first and second surfaces are planar. The first planar surface and the second planar surface are in sliding contact throughout the movement of the movable member relative to the fixed base. The first groove configuration, the second groove configuration, and the X-Y guide element are substantially confined between the fixed base and the movable member. The first planar surface and the second planar surface preferably include regions of sliding contact surrounding the first groove configuration, the second groove configuration and the X-Y guide element.

The X-Y movement mechanism may include each of the first groove configuration and the second groove configuration having a groove cross section with a top adjacent the first and second planar surfaces and a bottom remote therefrom. The groove cross section has a top width at the top and a bottom width at the bottom. The bottom width is greater than the top width. Each of the first half and the second half of the X-Y guide element has a guide cross section generally corresponding to the groove cross section. The X-Y guide element being disposed within the first groove configuration and the second groove configuration tends to maintain the second planar surface in sliding contact with the first planar surface. The groove cross section and the guide cross section can be trapezoidal.

In the preferred X-Y movement mechanism, the first groove configuration includes at least one first groove and the second groove configuration includes at least one second groove with at least one X-Y guide element therebetween. The one X-Y guide element includes the first half which is elongated in the X direction to extend along the first groove and the second half which is elongated in the Y direction to extend along the first groove. The first half and the second half are joined at the respective portions thereof which remain in alignment with the overlying regions of the first groove and the second groove throughout the movement of the movable member relative to the fixed base.

In one preferred X-Y movement mechanism, there is at least one first groove, at least one second groove, and at least one X-Y guide element. The one second groove has a second groove cross section which has a first width at the second surface and a second width remote from the second surface. The second width is greater than the first width. The second half of the X-Y guide element has a guide cross section corresponding to the second groove cross section for retaining the second half within the second groove. The X-Y movement mechanism can further include devices for selectively applying a force to the X-Y guide element in a direction toward the fixed base after the movement of the movable base relative to the fixed base to a selected position thereon to cause the second surface to be forced toward the first surface to maintain the movable base at the selected position. The second groove cross section could be T-shaped.

The preferred X-Y movement mechanism could include first adjusting elements mounted on the fixed base for selectively moving the X-Y guide element in the X direction within the first groove and second adjusting elements mounted on the movable member connected to the X-Y guide element for selectively moving the second groove in the Y direction relative to the X-Y guide means.

The preferred X-Y movement mechanism could include first adjusting elements mounted on the fixed base for selectively moving the movable member in the X direction as the X-Y guide element moves in the X direction along the first groove and second adjusting elements mounted on the fixed base for selectively moving the movable member in the Y direction as the second groove moves in the Y direction along the X-Y guide element.

An alternative X-Y movement mechanism can include a fixed base having a first surface and a movable member having a second surface means with the movable member being disposed for movement relative to the fixed base with the second surface being parallel with and facing toward the first surface. The fixed base has a first groove configuration in the first surface extending in an X direction. The movable member has a second groove configuration in the second surface extending in a Y direction. The X direction is different from and at an angle with respect to the Y direction. The X direction and the Y direction are parallel to the first surface and to the second surface. The first groove configuration and the second groove configuration respectively have overlying regions when the movable member is disposed for movement relative to the fixed base. An X-Y guide element has a first half and a second half. The first half is disposed in the first groove configuration for sliding, relative movement therebetween in the X direction. The second half is disposed in the second groove configuration for sliding, relative movement therebetween in the Y direction. The first half and the second half include portions thereof disposed within overlying regions of the first and second groove configuration. The X-Y movement mechanism could include a plurality of first grooves, a plurality of second grooves, and a plurality of X-Y guide elements. Each of the first grooves is generally aligned with a corresponding second groove to define the overlying regions. Each of the X-Y guide elements extends into each first groove and corresponding second groove at the overlying regions. The movable member is capable of movement in the X direction as the first half of each X-Y guide element moves in the X direction along the first groove and in the Y direction as the corresponding second groove moves in the Y direction on the second half of each X-Y guide element.

At least two of the plurality of first grooves may be displaced one from the other in the Y direction. At least two of the plurality of corresponding second grooves may be displaced one from the other in the X direction. Alternatively, at least two of the plurality of corresponding second grooves may be aligned in the Y direction. As a result, the two corresponding second grooves could be connected and the second halves of two of the X-Y guide elements respectively in the two first grooves and the two corresponding second grooves could be joined.

Additionally, at least two of the plurality of first grooves may be aligned in the X direction. Further, at least two of the plurality of corresponding second grooves may be displaced one from the other in the X direction. As a result, the two first grooves could be connected and the first halves of two of the X-Y guide elements respectively in the two first grooves and the two corresponding second grooves could be joined.

Still another X-Y movement mechanism includes a fixed base having a first surface and a movable member having a second surface. The movable member is disposed for movement in an X direction and in a Y direction relative to the fixed base with the second surface being parallel with and facing toward the first surface. The X direction and the Y direction are parallel to the first surface and to the second surface. The X direction is different from and at an angle with respect to the Y direction. The fixed base has a first X groove in the first surface extending in the X direction. The movable member has a first Y groove in the second surface extending in said Y direction. The first X groove and the first Y groove respectively have first overlying regions when the movable member is disposed for movement relative to the fixed base. A first X-Y guide element has a first X half and a first Y half. The first X half of the first X-Y guide element is disposed in the first X groove for sliding relative movement therebetween in the X direction. The first Y half of the first X-Y guide element is disposed in the first Y groove for sliding relative movement therebetween in the Y direction. The first X half and the first Y half of the first X-Y guide element includes portions thereof disposed within the first overlying regions of the first X groove and the first Y groove. The fixed base has a second Y groove in the first surface extending in the Y direction. The movable member has a second X groove in the second surface extending in the X direction. The second Y groove and the second X groove respectively has second overlying regions when the movable member is disposed for movement relative to the fixed base. A second X-Y guide element has a second Y half and a second X half. The second Y half of the second X-Y guide element is disposed in the second Y groove for sliding relative movement therebetween in the Y direction. The second X half of the second X-Y guide element is disposed in the second X groove for sliding relative movement therebetween in the X direction. The second Y half and the second X half of the second X-Y guide element includes portions thereof disposed within the second overlying regions of the second Y groove and the second X groove. The movable member is capable of movement in the X direction, as the first X half of the first X-Y guide element moves in the X direction along the first X groove and the second X groove moves in the X direction on the second X half of the second X-Y guide element. The movable member is capable of movement in the Y direction, as the first Y groove moves in the Y direction on the first Y half of the first X-Y guide element and the second Y half of the second X-Y guide element moves in the Y direction along the second Y groove.

The X-Y movement mechanism can include first adjusting elements mounted on the fixed base for selectively moving the first X-Y guide element in the X direction and second adjusting elements mounted on the fixed base for selectively moving the second X-Y guide element in the Y direction. Alternatively, the X-Y movement mechanism could include first adjusting elements mounted on the movable member for selectively moving the second X-Y guide element in the X direction and second adjusting elements mounted on the movable member for selectively moving the first X-Y guide element in the Y direction.

BRIEF DESCRIPTION OF THE DRAWINGS

FIG. 3 is a side view of an alternative X-Y guide element as seen along a section extending in the X direction.

FIG. 4 is a side view of the alternative X-Y guide element of FIG. 3 as seen along a section extending in the Y direction.

DETAILED DESCRIPTION OF THE PREFERRED EMBODIMENT

Figure 1:
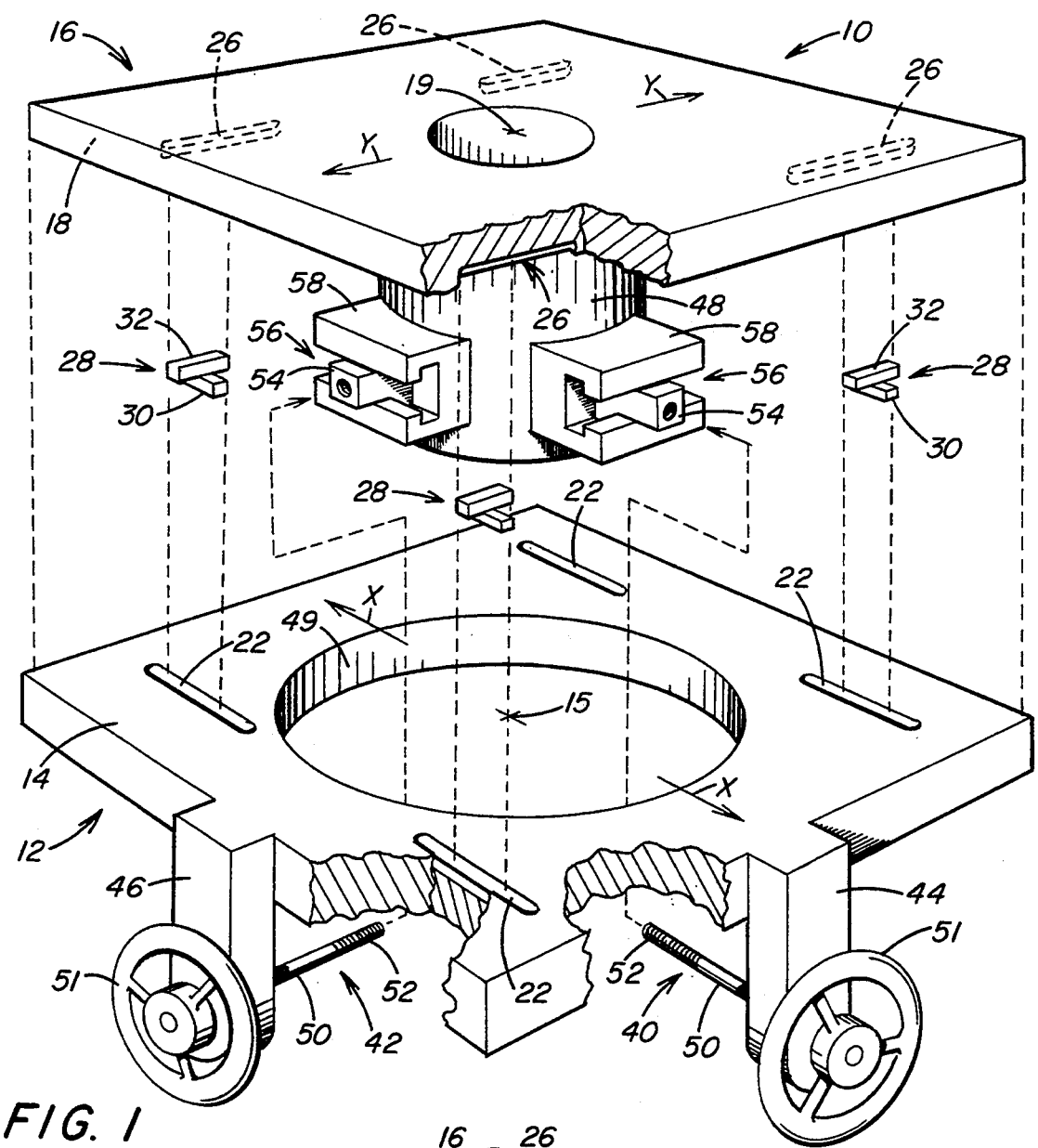
FIG. 1 is an exploded, perspective view, partially in sections, of a simplified X-Y movement mechanism including various features of the invention.

FIG. 1 includes an exploded, perspective view of a simplified configuration of a preferred X-Y movement mechanism similar to that disclosed in a patent application entitled "Portable Vertical Boring Machine", which was filed on the same date as the present application by the same inventor and assigned to the same assignee. The simplified X-Y movement mechanism 10 includes a fixed base 12 having a first surface 14 and a movable member 16 having a second surface 18. When installed on the fixed base 12, the movable member 16 is disposed for movement relative to the fixed base 12 with the second surface 18 being parallel with, facing toward and in sliding contact with the first surface 14.

The fixed base 12 includes first groove means in the form of a plurality of first grooves 22 in the first surface 14 which extend in an X direction as indicated by the arrows X in the various Figures. The movable member 16 includes second groove means in the form of a plurality of second grooves 26 which extend in a Y direction as indicated by the arrows Y in the various Figures. The X direction and Y direction are parallel to both the first surface 14 and the second surface 18. The preferred X-Y movement mechanism 10 includes the first grooves 22 being perpendicular to the second grooves 26. Although an alternative configuration might simply include the X direction being different from and at an angle with respect to the Y direction, these directions are preferably perpendicular to each other in the preferred mechanism 10.

When the movable member 16 is fully installed on the fixed base 12 with the second surface 18 in sliding contact with the first surface 14, the first grooves 22 and corresponding second grooves 26 are respectively disposed to include overlying regions 27 throughout the relative movement of the movable members 16 on the fixed base 12. To limit the relative movement to the desired X direction and/or Y direction, X-Y guide means includes a plurality of X-Y guide elements 28 which are respectively positioned within the first grooves 22 and second grooves 26.

Figure 2:
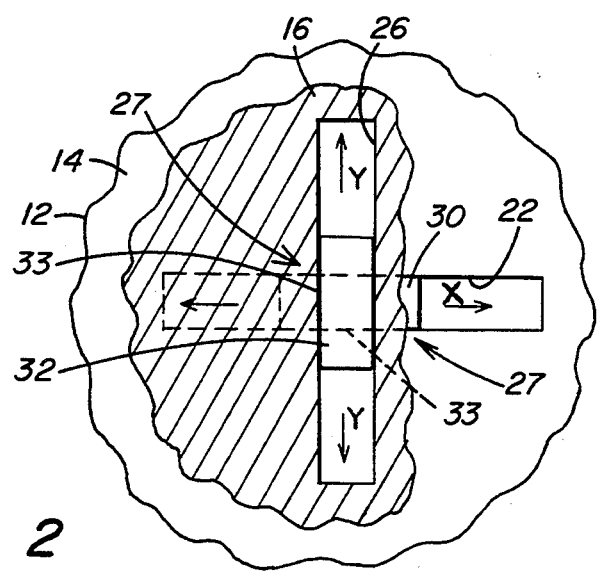
FIG. 2 is a top, fragmentary view partially in sections of one X-Y guide element of the mechanism of FIG. 1.

As seen in FIG. 2, each X-Y guide element 28 includes a first half 30 and a second half 32. The first half 30 is disposed in the first groove 22 for sliding, non-rotating relative movement therebetween in the X direction. The second half 32 is disposed in the second groove 26 for sliding, non-rotating relative movement therebetween in the Y direction. The junction between the first half 30 and second half 32 is such that they each include portions 33 thereof which are disposed and remain within the moving overlying regions 27 of the first groove 22 and the second groove 26 throughout the desired movement of the movable member 16 upon the fixed base 12. The first half 30 is elongated in the X direction at either side of the portion 33 and the second half 32 is elongated in the Y direction at either side of the portion 33 to provide additional stability to the X-Y guide element 28 as it slides relative to the grooves 22,26.

When the preferred movable member 16 of FIG. 1 is fully installed upon the fixed base 12 for the limited movement therebetween in the X and/or Y directions, each of the corresponding first grooves 22, second grooves 26 and X-Y guide elements 28 are confined within regions of sliding contact between the first surface 14 and second surface 18. The confinement between the surfaces 14,18 protect the X-Y guide means 28 throughout movement within the first groove 22 and second groove 26. With a configuration in which the second surface 18 is maintained in sliding contact with the first surface 14, undesired particles or contaminates will be prevented from collecting within the first grooves 22 and second grooves 26 which could interfere with the movement of the X-Y guide elements 28. Since it would be expected that some form of lubricating means would be applied to the X-Y guide element 28 and/or grooves 22,26, any means which could effectively prevent the loss or contamination of the lubricating means would be desirable.

The use of four X-Y guide elements 28 within four corresponding first grooves 22 and second grooves 26 at the corners of the fixed base 12 and movable member 16 generally provides an even distribution around the center 15 of the upper surface 14 and the center 19 of the lower surface 18. The even distribution of the X-Y guide elements 28 will tend to balance the sliding forces between the movable member 16 and the fixed base 12.

As thus described, any means for moving the movable member 16 on the fixed base 12 would be limited to the X and/or Y direction without any relative rotation therebetween. Although the X-Y movement mechanism disclosed in the heavy duty machine of the patent application entitled "Portable Vertical Boring Machine" discussed hereinabove includes a specific mechanism for producing movement in an X direction and/or Y direction, it should be noted that any reasonable means for applying force to the movable member 16 could produce a desired movement of the movable member 16 on the fixed base 12.

As seen in FIG. 1, the simplified X-Y movement mechanism 10 includes a simplified first adjusting means 40 and second adjusting means 42 for controlled, selective adjustment of the movable member 16 on the fixed base 12. To provide general coupling between the fixed base 12 and the movable member 16, the fixed base 12 includes two depending brackets 44,46 disposed at adjacent sides of the base 12 to be disposed at a right angle with respect to each other. The movable member 16 includes a depending central member 48 which is adapted to be installed within a large opening or hole 49 in the fixed base 12 to extend below the first surface 14.

The first adjusting means 40 includes a shaft 50 which is mounted for rotation on the bracket 44 by the selective rotation of a band wheel 51. The extended end of the shaft 50 includes a threaded region 52. The shaft 50 and threaded portion 52 of the first adjusting means 40 extend in the X direction. When the movable member 16 is fully installed on the fixed base 12, the threaded portion 52 of the shaft 50 is threadably received within a T-shaped nut 54. The T-shaped nut 54 is installed for sliding movement in the Y direction within a T-shaped slot 56 of an adjustment block 58 which is fixedly secured to the center portion 48 in alignment with the depending bracket 44. Consequently, when the movable member 16 is fully installed on the fixed base 12, rotation of the hand wheel 51 will cause rotation of the threaded portion 52 of the shaft 50 within the T-shaped nut 54. Rotation of the threaded portion 52 will produce inward and outward movement of the T-shaped nut 54 and corresponding inward and outward movement of the adjustment block 58 in the X direction. The second adjusting means 42 includes a similar configuration of a hand wheel 51, shaft 50 and threaded portion 52 on the depending bracket 46. The shaft 50 and threaded portion 52 of the second adjusting means 42 extends in a Y direction for alignment with a second adjustment block 58 installed on the center portion 48 in alignment with the depending bracket 46.

The preferred configuration of the first adjusting means 40 and second adjusting means 42 allows selective movement of the movable member 16 in either the X or Y direction without interference by the other adjusting means 40 or 42. Movement in the X direction through the adjusting means 40 is accomplished independently of the second adjusting means 42 by the use of the T-shaped nut 54 within the T-slot 56 of the adjustment block 58 of the first adjusting means 40. When the first adjusting means 40 is utilized, the T-shaped nut 54 associated with the second adjusting means 42 will slide along the T-shaped slot 56 thereof. Similarly, when adjustment is made in the Y direction through the use of the second adjusting means 42, the T-shaped nut 54 associated with the first adjusting means 40 will move along the T-shaped slot 56 to prevent any interference thereby.

While the preferred mechanism 10 of FIG. 1 and 2 will insure that movement is limited to the X and/or Y directions, there is nothing provided therein to insure that the movable member can be securely retained on the fixed base after the desired position is obtained. An alternative configuration 60 for the X-Y guide means and groove means, as shown in FIGS. 3 and 4, could be employed at each of the corners of a fixed base 62 having a first surface 64 and movable member 66 having a second surface 68 similar to those of FIG. 1.

As seen in FIGS. 3 and 4, one of the four first grooves 72 of the configuration 60 in the first surface 64 extends in the X direction. On the other hand, one of the four second grooves 76 of the configuration 60 in the second surface 68 extends in the Y direction. The alignment of the grooves 72, 76 are such that a movable region 77 of the second groove 76 overlies a movable region 73 of the first groove 72. Basically, mounted between the first surface 64 and the second surface 68, for installation within the groove 72 in the X direction and the groove 76 in the Y direction, is X-Y guide element 78. The X-Y guide element 78 includes a first half 80 and a second half 82. The first half 80 is elongated to extend in the X direction for sliding movement within the groove 72. The second half 82 is elongated to extend in the Y direction for sliding movement within the groove 76. In other words, with the X-Y guide element 78 installed in both of the grooves 72 and 76, the relative movement between the movable member 66 and the fixed base 62 is limited to movement which will allow the X-Y guide element 78 to move in the X direction along the groove 72 and the movable member 66 to move in the Y direction, relative to the second half 82 of the X-Y guide element 78, along the groove 76. Accordingly, selective relative movement of the movable member 66 is possible in either the X or Y direction on the fixed base 62.

In the preferred configuration 60, the cross section of the second groove 76 is not identical to the cross section of the first groove 72. The X-Y guide element 78 in the second groove 76 is T-shaped to include an enlarged region 83 of the second half 82. Consequently, the groove 76 is also generally T-shaped in order to allow the region 83 to be retained within the groove 76. One end 76E of the groove 76 is enlarged to allow the second half 82 to be installed within the second groove 76 during assembly.

It should also be noted that the first groove 72 does not simply extend into the first surface 64 but includes an elongated hole 88 in the lower region thereof. The preferred X-Y guide element 78 includes a threaded hole 90 extending vertically therethrough for the receipt of bolt means 92. Bolt means 92 in turn includes an adjustable nut 94 at the lower end thereof. Specifically, the mounting of the X-Y guide element 78 within the grooves 72, 76 allows bolt means 92 to extend through the hole 88 to a region below the fixed base 62.

Mounted around bolt means 92 between the fixed base 62 and the nut 94 is a hydraulic clamping cylinder 96. Accordingly, activation of the hydraulic clamping cylinder 96 will produce downward movement on the nut 94 and corresponding downward movement of the X-Y guide element 78. When the X-Y guide element 78 is pulled downwardly, the enlarged region 83 will act upon the T-shaped second groove 76 to firmly clamp the second surface 68 into firm contact with the first surface 64. The substantial region of contact and the force created by four such X-Y guide elements 78 would produce significant frictional forces to prevent any continued relative movement between the movable member 66 and the fixed base 62. Consequently, while the X-Y guide element 78 will allow selective movement of the movable member 66 relative to the fixed base 62, once the desired positioning of the member 66 on the base 62 is obtained, activation of the hydraulic clamping cylinders 96 will prevent any continued relative movement therebetween.

It should be noted that the substantial region of contact between the first surface 64 and the second surface 68 would again completely encircle the grooves 72, 76 and the X-Y guide elements 78 installed therein throughout the movement in the X and Y directions. Consequently, the preferred configurations 60 again include the grooves 72, 76 and the X-Y guide elements 78 being substantially confined between the movable member 66 and fixed base 62. This feature is particularly attractive and advantageous for use in boring, milling or facing machines or the like because of the nature of the boring, milling and/or facing operation which could result in small shavings or chips of material that could collect in and interfere with the continued reliable operation of the X-Y guide elements 78 within the grooves 72, 76. The preferred confinement of the grooves 72, 76 and X-Y guide elements 78 allows them to be maintained in a clean, reliable manner as any lubricating means which is used to facilitate movement between the member 66 and base 62 remains uncontaminated.

It should be noted that there are some relative dimensions for the X-Y guide element 78 and grooves 72, 76 which insure the desired operation as described. For example, the base surface 80L of the first half 80 of the X-Y guide element 78 should not rest upon or make contact with a base 72B of the first groove 72 or a region thereof around the elongated hole 88. Such contact should be prevented to insure the first half 80 will not apply any force to the fixed base 62 when the hydraulic clamping cylinder 96 is activated. Further, the outward surface 80U of the first half 80 should be disposed below the first surface 64 to prevent any contact with the second surface 68 as the movable member 66 is moved on the fixed base 62.

Still further, the outward surface 82L of the second half 82 of the element 78 should be disposed within the groove 76 above the second surface 68 to insure that the second half 82 does not interfere with the movement of the member 66. This is primarily assured by the height H of the second half 82 from the outward surface 82L to the enlarged region 83 being equal to or slightly less than the depth D of the groove 76 to the enlarged portion thereof. The preferred dimensions perpendicular to the surfaces 64, 68 will insure that the only contact in the perpendicular direction between the X-Y guide element 78 and the grooves 72, 76 is located at the outward surface 83L of the enlarged region 83 of the second half 82 as it overlies and contacts the inward surface 76U of the enlarged portion of the T-shaped groove 76.

The sides of the first half 80 and second half 82 of the X-Y guide element 78 will respectively be in sliding contact with the side walls of the grooves 72 and 76 to insure the desired movement in the X and Y directions. However, the perpendicular dimensions of the preferred X-Y guide element 78 will limit the contact in a perpendicular direction to that which is between the outward surface 83L of the enlarged region 83 and the inward surface 76U of the enlarged portion of the T-shaped second groove 76. Consequently, the second surface 68 of the member 66 remains in contact with the first surface 64 of the base 62 and nothing restricts or prevents the clamping force from being applied to the surfaces 64, 68 after the member 66 is selectively moved on the base 62 to a desired position by any reasonable means including, for example, the adjusting means 40, 42 of the mechanism 10.

Figure 5:
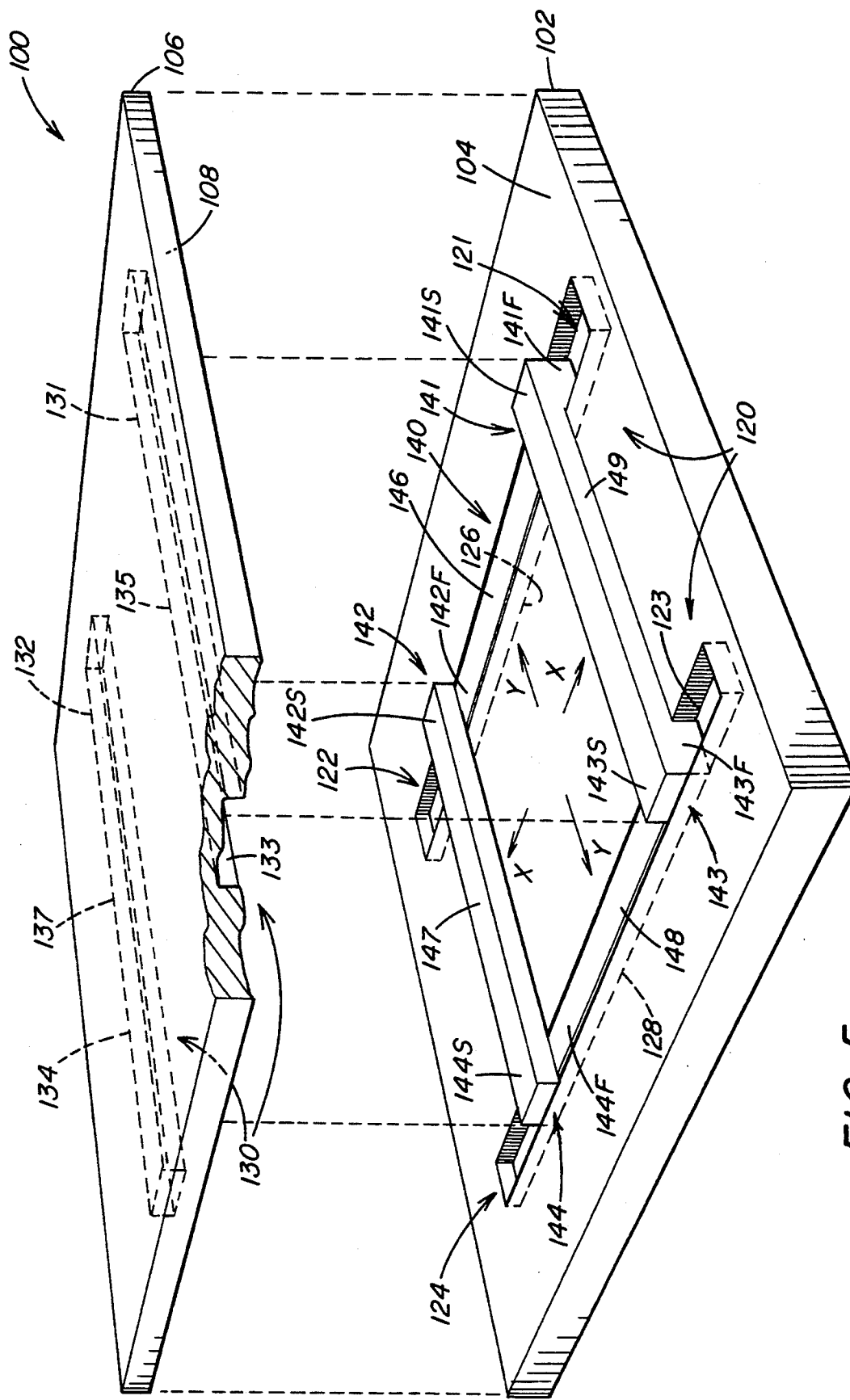
FIG. 5 is an exploded, perspective view, partially in sections, of another simplified X-Y movement mechanism including various features of the invention.

As seen in FIG. 5, an alternative X-Y movement mechanism 100 will provide the same guidance in an X direction and/or Y direction as will the mechanism 10 and configuration 60 discussed hereinabove. The X-Y movement mechanism 100 includes a fixed base 102 with a first surface 104 thereon. A movable member 106 includes a second surface 108 thereon. When configured to produce the limited movement in the X direction and/or Y direction, the movable member 106 will be disposed for movement relative to the fixed base 102 with the second surface 108 being parallel with, facing toward and adjacent to the first surface 104.

The fixed base 102 includes first groove means 120 in the first surface 104 extending in an X direction. The movable member 106 includes second groove means 130 in the second surface 108 extending in the Y direction. The X direction and Y direction are parallel to the first surface 104 and the second surface 108. Again, although the X direction and Y direction are perpendicular to each other, it is only essential that the X direction be different from and at an angle with respect to the Y direction. The first groove means 120 includes first groove portions 121, 122, 123, 124 and the second groove means 130 includes second groove portions 131, 132, 133, 134 which respectively have overlying regions when the movable member 106 is disposed for movement relative to the fixed base 102.

X-Y guide means 140 includes X-Y guide portions 141, 142, 143, 144. The X-Y guide portions 141, 142, 143, 144 respectively include first halves 141F, 142F, 143F, 144F and second halves 141S, 142S, 143S, 144S. The first halves 141F, 142F, 143F, 144F are respectively disposed in the first groove portions 121, 122, 123, 124 for sliding, relative movement therebetween in the X direction. The second halves 141S, 142S, 143S, 144S are disposed in the second groove portions 131, 132, 133, 134 for sliding, relative movement therebetween in the Y direction. The junction between the first half 141F and the second half 141S includes portions thereof which are disposed within the overlying regions of the first groove portion 121 and the second groove portion 131. A similar configuration exists between the first halves and second halves of the other guide portions 142, 143, 144 disposed within the overlying regions of the corresponding first and second groove portions thereof. As generally defined in terms of groove portions and X-Y guide portions, the X-Y movement mechanism 100 is similar to the mechanism 10 of FIGS. 1 and 2. However, by providing connection between the various groove portions and X-Y guide portions, an overall configuration eliminates the need for the installation of separate X-Y guide elements in separate, spaced grooves disposed about the surfaces of the fixed base and movable member.

This is accomplished by including the first groove portions 121,122 being displaced from the other first groove portions 123,124 in the Y direction. Similarly, the second groove portions 131,133 are displaced from the other second groove portions 132,134 in the X direction. Still further, the first groove portions 121,122 are aligned with each other in the X direction to include a connecting first groove portion 126 while the first groove portions 123,124 are joined at a connecting first groove portion 128. The second groove portions 131,133 are displaced from the second groove portions 132,134 in the Y direction. On the other hand, the preferred second groove portions 131,133 are aligned with each other and joined through a connecting second groove portion 135 while the second groove portions 132,134 are aligned with each other and joined by a connecting second groove portion 137.

To complete the preferred configuration to provide a unitary X-Y guide means 140, the first halves 141F,142F are joined by a first connecting half 146, the second halves 142S,144S are joined by a second connecting half 147, the second halves 141S,143S are joined by a second connecting half 149 and the first halves 143F,144F are joined by a first connecting half 148.

The means for insuring smooth guidance in both the X direction and/or Y direction for mechanism 10 and the configuration 60 primarily relied upon the close fitting of the first and second halves of the X-Y guide elements along both sides of the grooves thereof. On the other hand, the X-Y movement mechanism 100 is configured to insure smooth, proper guidance in the X direction by the spacing between the first groove portions 121,126,122 and the first groove portions 123,128,124 as they are compared with the overall combined length of the second halves 141S,149,143S and the combined overall length of the second halves 142S,147,144S. A similar relationship between the distance between the second groove portions of the second groove means 130 as compared with the overall length of the combined first halves of the X-Y guide means 140 will assure proper, aligned movement in the Y direction.

The preferred X-Y guide means 140 within the first groove means 120 and second groove means 130 will assure the desired movement in the X direction and/or Y direction. However, it would be possible to alter the X-Y guide means 140 in one manner or another to basically eliminate the unitary structure thereof while still providing the preferred overall function. For example, the X-Y guide means 140 could be formed by two separate portions by removing the connecting first half portions 146,148. Similarly, the unitary X-Y guide means 140 could be formed of two separate members by the removal of the connecting second half portions 147,149. Clearly, if the unitary structure of the preferred X-Y guide means 140 is altered to provide two halves thereof, the sides of the associated groove means 120,130 would be configured to closely receive the appropriate halves of the X-Y guide portions extending therein in a manner similar to that provided in the preferred X-Y movement mechanism 10 discussed hereinabove.

The preferred X-Y movement mechanism 10, alternative configuration 60 and alternative mechanism 100 include X-Y guide means in the form of a plurality of guide elements or portions disbursed about the surfaces between the fixed base and movable member. Generally, it is expected that the preferred means for limiting the movement for the movable member on the fixed base to the X direction and/or Y direction would include a plurality of X-Y guide elements disbursed about the surfaces to insure smooth, even guidance during the movement of the movable member. The X-Y guide elements being displace one from the other in both the X direction and Y direction insures that the movable member will not rotate with respect to the fixed member independent of the actual shape provided to the X-Y guide means employed therein.

Figure 6:
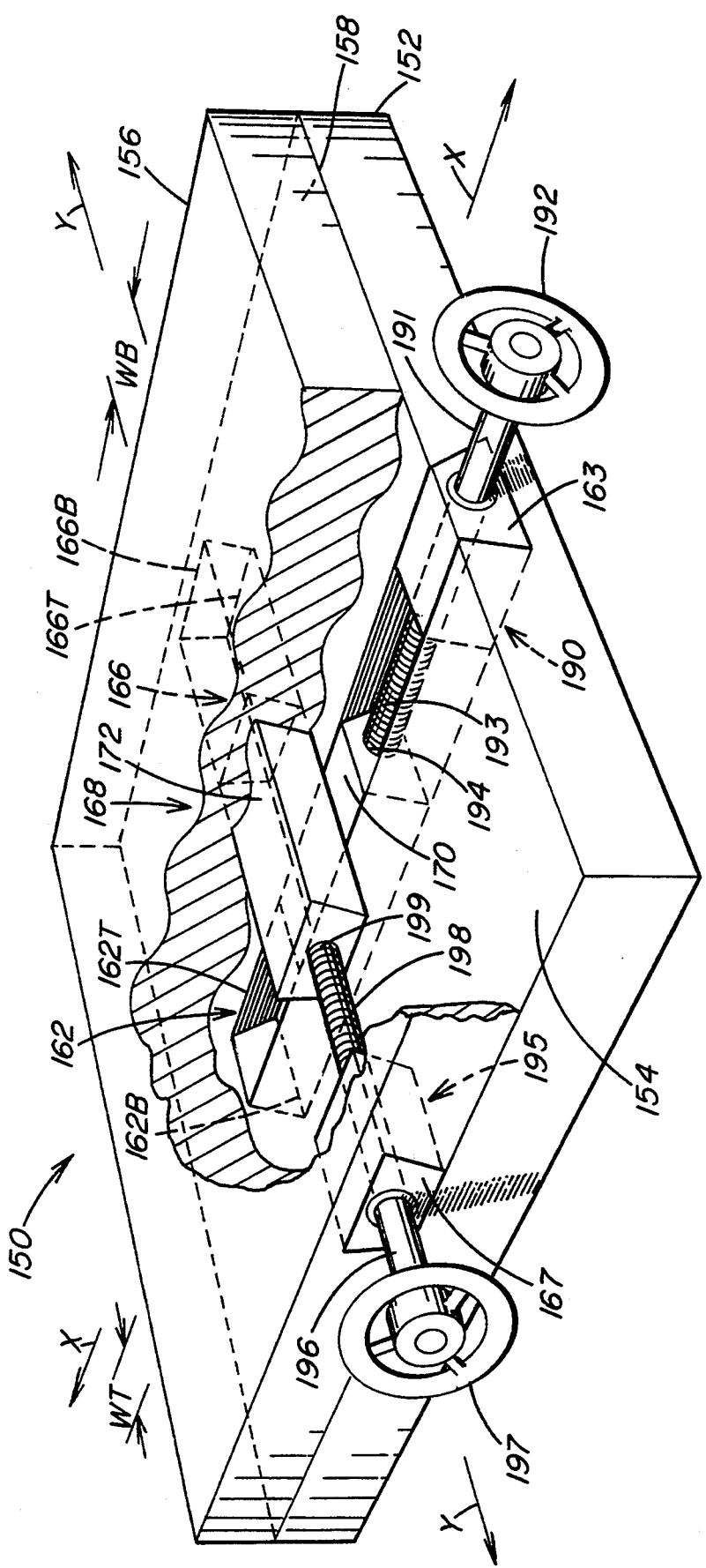
FIG. 6 is a perspective view, partially in sections, of still another X-Y movement mechanism including various features of the invention.

On the other hand, as seen FIG. 6, another alternative X-Y movement mechanism 150 includes another X-Y guide means configuration within associated grooves with alternative adjustment means which may be easier to provide than even the simplified first adjustment means 40 and second adjustment means 42 of the X-Y movement mechanism 10 discussed hereinabove.

The X-Y movement mechanism 150 includes a fixed base 152 having a first surface 154 and a movable member 156 having a second surface 158. Again, the movable member 156 is disposed for movement relative to the fixed base 152 with the second surface 158 thereof being parallel with, facing toward and in contact with the first surface 154. The fixed base 156 includes a first groove 162 in the first surface 154 extending in the X direction. The movable member 156 includes a second groove 166 in the second surface 158 extending in the Y direction. Again, the X direction and Y direction are preferably perpendicular to each other although the X direction could be different from and at an angle with respect to the Y direction.

In the X-Y movement mechanism 150, the first groove 162 and second groove 166 again respectively have overlying regions when the movable member 156 is disposed for movement relative to the fixed base 152. A single X-Y guide element 168 has a first half 170 and a second half 172. The first half 170 is disposed in the first groove 162 for sliding, non-rotating relative movement therebetween in the X direction. The second half 172 is disposed in the second groove 166 for sliding, non-rotating relative movement therebetween in the Y direction. The first half 170 and second half 172 are again joined at portions thereof which are disposed within the overlying regions of the first groove 162 and second groove 166. As generally defined, the movable member 156 would again be capable of movement in the X direction as the first half 170 of the X-Y guide element 168 moves in the X direction along the first groove 162 and in the Y direction as the second groove 166 moves in the Y direction on the second half 172 of the X-Y guide element 168.

The X-Y movement mechanism 150 is generally configured with the single X-Y guide element 168 to retain the movable member 156 on the fixed base 152 with the second surface 158 in sliding contact with the first surface 154. This is accomplished be each of the first groove 162 and second groove 166 having a groove cross section with respective tops 162T,166T adjacent the first surface 154 and second surface 158 and respective bottoms 162B,166B remote therefrom. The groove cross section has a top width WT at the tops 162T,166T and a bottom width WB at the bottoms 162B,166B. The bottom widths WB are greater than the top widths WT for each of the grooves 162,166. Similarly, each of the first half 170 and second half 172 of the X-Y guide element 168 has a guide cross section generally corresponding to the groove cross sections of the first groove 162 and second groove 166. Consequently, when the X-Y guide means 168 is disposed within the first groove 162 and the second groove 166, it tends to maintain the second surface 158 in sliding contact with the first surface 154. As seen in FIG. 6, the preferred groove cross section and guide cross section are trapizoidal.

Because of the trapizoidal cross section of the grooves 162,166 and the first half 170 and second half 172 of the X-Y guide element 168, the grooves 162 and 166 are configured to extend at least to one side of the respective fixed base 152 and movable member 156 thereof. By extending the grooves 162,166, insertion of the X-Y guide element 168 is possible during the initial installation of the movable member 156 on the fixed base 152.

The single X-Y guide element 168 includes a convenient means for providing a first adjusting means 190 and a second adjusting means 195 for the selective movement of the movable member 156 on the fixed base 152. The first adjustment means 190 includes an end plug 163 installed within the end of the first groove 162. The end plug 163 has an internal bearing for rotatably supporting a shaft 191 therein. The shaft 191 has an adjustable hand wheel 192 mounted on the outward end thereof. The interior end of the shaft 191 includes a threaded portion 193 which is threadably received within a threaded hole 194 extending through the interior of the first half 170 in the X direction. The second adjustable means 195 includes a similar end plug 167 for the second groove 166 having a bearing therein for rotatably supporting a shaft 196 with a hand wheel 197 mounted on the outer end thereof. Again, a threaded portion 198 is received within a threaded hole 199 extending longitudinally through the second half 172 of the X-Y guide means 168.

With the threaded portion 193 extending through the threaded hole 194 in the first half 170 and the threaded portion 198 extending through the threaded hole 199 in the second half 172, selective rotation of the hand wheels 192,196 will produce desired movement of the movable member 156 on the fixed base 152. It should be noted that the use of the end plugs 163,167 will provide a continuation of the first surface 154 and second surface 158 for proper containment of the X-Y guide element 168 within the interior of the grooves 162,166 between the movable member 156 and fixed base 152. The confinement made possible, in part, by the use of the end plugs 163,167 is similar to that described hereinabove which will allow lubricating means to be used on the X-Y guide element 168 and within the grooves 162,166 without any loss or contamination thereof.

Figure 7:
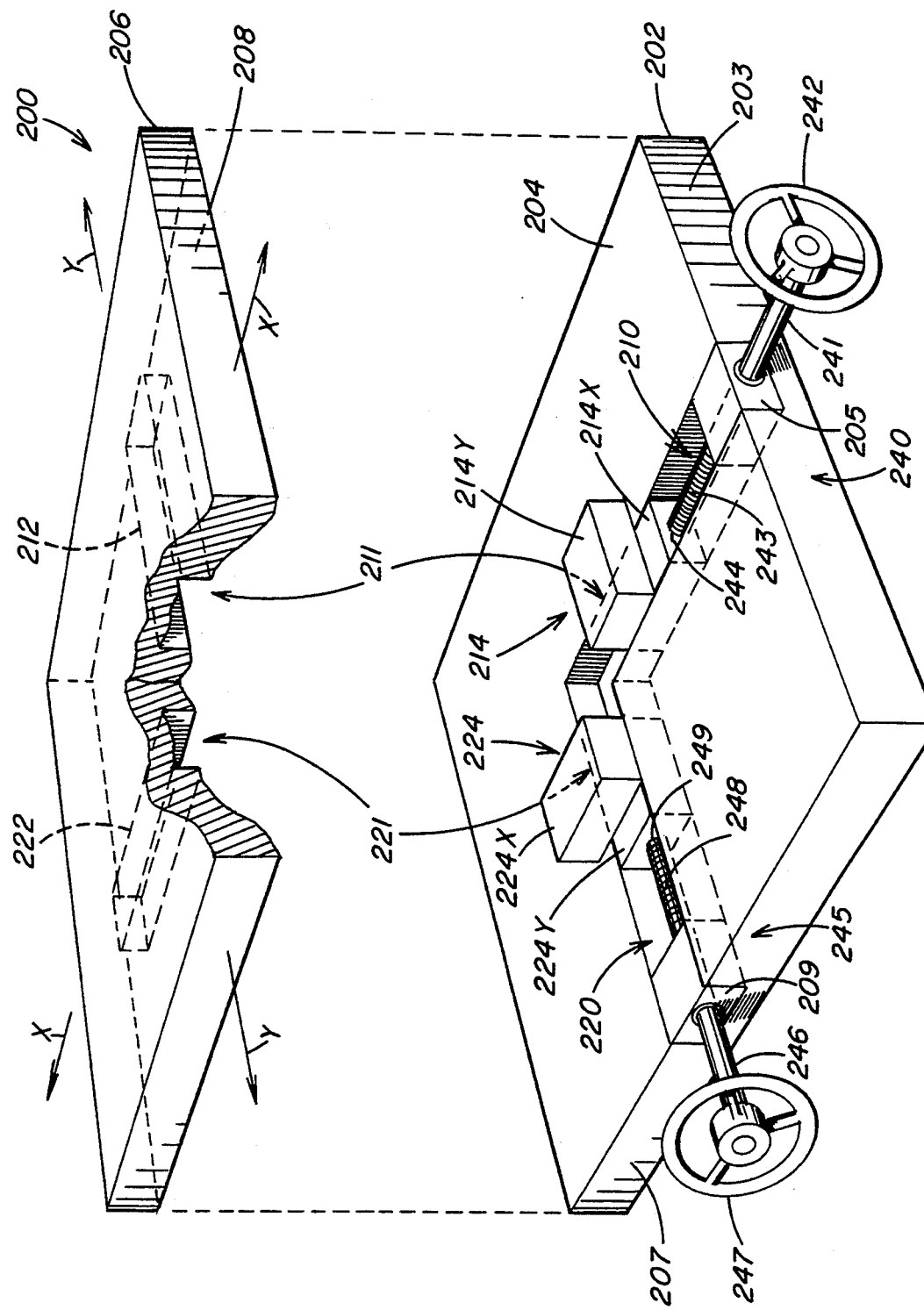
FIG. 7 is an exploded, perspective view, partially in sections, of yet another X-Y movement mechanism including various features of the invention.

As seen in FIG. 7, yet another X-Y movement mechanism 200 is provided to include an alternative feature which is not provided in the embodiments disclosed hereinabove. For example, the mechanisms and configurations discussed hereinabove tend to include first grooves in a first surface which extend in one direction and the second grooves in the second surface which extend in a different direction. As seen by the X-Y movement mechanism 200 of FIG. 7, other combinations of groove means and X-Y movement means could be employed to provide the overall function of guiding a movable member on a fixed base in an X direction and/or Y direction similar to that discussed hereinabove.

The X-Y movement mechanism 200 includes a fixed base 202 having a first surface 204 and a movable member 206 having a second surface 208. The movable member 206 is again disposed for movement relative to the fixed base 202 with the second surface 208 being parallel with, facing toward and in sliding contact with the first surface 204.

The fixed base 202 includes a first X groove 210 in the first surface 204 extending in an X direction. The movable member 206 includes a first Y groove 212 in the second surface 208 extending in a Y direction. Again, the X direction and Y direction are preferably at right angles with respect to each other. The first X groove 210 and first Y groove 212 respectively include overlying regions 211 when the movable member 206 is disposed for movement relative to the fixed base 202. A first X-Y guide element 214 has a first X half 214X and a first Y half 214Y. The first X half 214X of the first X-Y guide element 214 is disposed in the first X groove 210 for sliding relative movement therebetween in the X direction. The first Y half 214Y of the first X-Y guide element 214 is disposed in the first Y groove 212 for sliding relative movement therebetween in the Y direction. Again, the first X half 214X and first Y half 214Y of the first X-Y guide element 214 are joined to include portions thereof disposed within the first overlying regions 211 of the first X groove 210 and first Y groove 212.

The X-Y movement mechanism 200 also includes the fixed base 202 having a second Y groove 220 in the first surface 204 extending in the Y direction. The movable member 206 has a second X groove 222 in the second surface 208 extending in the X direction. The second Y groove 220 and the second X groove 222 respectively have second overlying regions 221 when the movable member 206 is disposed for movement relative to the fixed base 202. A second X-Y guide element 224 has a second Y half 224Y and a second X half 224X. The second Y half 224Y of the second X-Y guide element 224 is disposed in the second Y groove 220 for sliding relative movement therebetween in the Y direction. The second X half 224X of the second X-Y guide element 224 is disposed in the second X groove 222 for sliding relative movement therebetween in the X direction. Again, the second Y half 224Y and the second X half 224X of the second X-Y guide element 224 are joined to include portions thereof disposed within the second overlying regions 221 of the second Y groove 220 and second X groove 222.

From the discussion of the X-Y movement mechanism 200, it should be clear that the movable member 206 is capable of movement in the X direction as the first X half 214X of the first X-Y guide element 214 moves in the X direction along the first X groove 210 and the second X groove 222 moves in the X direction on the second X half 224X of the second X-Y guide element 224. The movable member 206 is capable of movement in the Y direction as the first Y groove 212 moves in the Y direction on the first Y half 214Y of the first X-Y guide element 214 and the second Y half 224Y of the second X-Y guide element 224 moves in the Y direction along the second Y groove 220. From the description of the X-Y movement mechanism 200, it should be clear that a plurality of X-Y guide elements can be utilized with different first and second halves disposed within different grooves in the movable member and/or fixed member to again insure that the relative movement therebetween is limited to the X direction and/or Y direction.

However, the X-Y movement mechanism 200 allows a different, simplified configuration for a first adjusting means 240 and a second adjusting means 245. To allow access to the first X-Y guide element 214, the first X groove 210 is extended to the end 203 of the fixed base 202. An end plug 205 of the first adjusting means 240 is installed in the end of the first X groove 210 and includes a bearing for rotatably supporting a shaft 241 having a hand wheel 242 mounted on the end thereof. The shaft 241 includes an inward threaded portion 243 which is threadably received within a hole 244 in the first X half 214X of the X-Y guide element 214. Rotation of the hand crank 242 will advance or retract the first X half 214X within the first X groove 210 to cause movement of the movable member 206 in the X direction as the first Y half 214Y acts upon the interior of the first Y groove 212. As this occurs, the second X groove 222 will freely move in an X direction on the second X half 224X of the second X-Y guide element 224.

Similarly, the second adjusting means 245 includes the elongated second Y groove 220 extending to the side 207 of the fixed base 202. An end plug 209 is again installed in the end of the second Y groove 220 to include a bearing therein for rotatably supporting a shaft 246 therein. The outward end of the shaft 246 again includes a hand wheel 247. The shaft 246 includes a threaded portion 248 which is threadably received within a hole 249 extending in the Y direction through the second Y half 224Y of the second X-Y guide element 224. Again, rotation of the hand wheel 247 in either direction will cause extension or retraction of the second X-Y guide element 224 along the second Y groove 220. The movement within the Y groove 220 will result in the second X half 224X acting upon the interior of the second X groove 222 to cause selective movement of the movable member 206 in the Y direction. As the second adjusting means 245 is utilized, the movable member 206 will be capable of moving in the Y direction as the first Y groove 212 moves in a Y direction along the first Y half 214Y of the first X-Y guide element 214.

It is significant to note that the configuration employed in the X-Y movement mechanism 200 provides a simplified means of mounting both the first adjusting means 240 and second adjusting means 245 on the fixed base 204. However, it should also be noted that a similar configuration could be provided with a first and second adjusting means being alternatively mounted on the movable member at adjacent ends thereof. Those skilled in the art will understand that the mechanism 200 could be reconfigured by simply reversing the fixed base 202 and the movable member 206. The resulting configuration will operate in the same manner but with the first adjusting means and second adjusting means being mounted for support at the ends of grooves in the surface of the movable member 206 rather than the fixed member 202.

From the various embodiments discussed hereinabove, it should be clear that various alternative configurations and features could be employed without departing from the scope of the invention as claimed. For example, in some mechanisms, two, three or more X-Y guide elements could be used. Although the description and claims refer to grooves or groove portions, it should be clear that such terms would include channels or channel portions. The shape of X-Y guide elements and the cross-sections of the grooves could be altered as long as a single guide element includes a configuration that insures non-rotating, sliding disposition within the grooves. The X-Y guide elements could include a different configuration for mating within the grooves to insure the smooth, even movement therealong to control the movement of the movable member in the X direction and Y direction. Such a configuration could include some form of bearing or the like mounted at the sides or base of the X-Y guide elements. Further, the sides of the grooves could be provided with adjustable tapered gibs or the like which are well known in the art to insure that the halves of the X-Y guide means would be closely received within the grooves for controlled sliding movement therealong. Clearly, those skilled in the art could alter the preferred mechanisms without departing from the scope of the invention as claimed.

What is claimed is:

1. An X-Y movement mechanism comprising:
    a fixed base having first surface means;
    a movable member having second surface means;
    said movable member being disposed for movement relative to said fixed base with said second surface means being parallel with and facing toward said first surface means;
    said fixed base having first groove means in said first surface means extending in an X direction;
    said movable member having second groove means in said second surface means extending in a Y direction;
    said X direction being different from and at an angle with respect to said Y direction;
    said X direction and said Y direction being parallel to said first surface means and to said second surface means;
    said first groove means and said second groove means respectively having overlying regions when said movable member is disposed for said movement relative to said fixed base;
    X-Y guide means having a first half and a second half;
    said first half being disposed in said first groove means for sliding, non-rotating relative movement therebetween in said X direction;
    said second half being disposed in said second groove means for sliding, non-rotating relative movement therebetween in said Y direction;
    said first half and said second half including portions thereof disposed within said overlying regions of said first and said second groove means;
    said first surface means including a first planar surface;
    said second surface means including a second planar surface;
    said first planar surface and said second planar surface being in sliding contact throughout said movement of said movable member relative to said fixed base;
    said first groove means, said second groove means, and said X-Y guide means being substantially confined between said fixed base and said movable member;
    said first planar surface and said second planar surface including regions of said sliding contact surrounding said first groove means, said second groove means and said X-Y guide means; and
    whereby said movable member is capable of movement in said X direction as said first half of said X-Y guide means moves in said X direction along said first groove means and in said Y direction as said second groove means moves in said Y direction on said second half of said X-Y guide means.

2. The X-Y movement mechanism according to claim 1, wherein said X direction is perpendicular to said Y direction.

3. The X-Y movement mechanism according to claim 1, wherein
    each of said first groove means and said second groove means has a groove cross section with a top adjacent said first and said second planar surfaces and a bottom remote therefrom,
    said groove cross section has a top width at said top and a bottom width at said bottom,
    said bottom width is greater than said top width, and
    each of said first half and said second half of said X-Y guide means has a guide cross section generally corresponding to said groove cross section,
    whereby said X-Y guide means being disposed within said first groove means and said second groove means tends to maintain said second planar surface in sliding contact with said first planar surface.

4. The X-Y movement mechanism according to claim 3, wherein said groove cross section and said guide cross section are trapezoidal.

5. The X-Y movement mechanism according to claim 1, wherein
    said first groove means includes at least one first groove,
    said second groove means includes at least one second groove,
    said X-Y guide means includes at least one X-Y guide element,
    said at least one X-Y guide element includes said first half which is elongated in said X direction to extend along said first groove and said second half which is elongated in said Y direction to extend along said second groove, and
    said first half and said second half are joined at said respective portions thereof which remain in alignment with said overlying regions of said first groove and said second groove throughout said movement of said movable member relative to said fixed base.

6. The X-Y movement mechanism according to claim 1, wherein
    said first groove means includes a plurality of first grooves;
    said second groove means includes a plurality of second grooves;
    said X-Y guide means includes a plurality of X-Y guide elements;
    each of said first grooves is generally aligned with a corresponding said second groove to define said overlying regions; and
    each of said X-Y guide elements extends into said each first groove and said corresponding second groove at said overlying regions.

7. The X-Y movement mechanism according to claim 6, wherein at least two of said plurality of said first grooves are aligned in said X direction.

8. The X-Y movement mechanism according to claim 7, wherein at least two of said plurality of said corresponding second grooves are displaced one from the other in said X direction.

9. The X-Y movement mechanism according to claim 6, wherein at least two of said plurality of said first grooves are displaced one from the other in said Y direction.

10. The X-Y movement mechanism according to claim 9, wherein at least two of said plurality of said corresponding second grooves are displaced one from the other in said X direction.

11. The X-Y movement mechanism according to claim 9, wherein at least two of said plurality of said corresponding second grooves are aligned in said Y direction.

12. An X-Y movement mechanism comprising:
a fixed base having first surface means;
a movable member having second surface means;
said movable member being disposed for movement relative to said fixed base with said second surface means being parallel with and facing toward said first surface means;
said fixed base having first groove means in said first surface means extending in an X direction;
said movable member having second groove means in said second surface means extending in a Y direction;
said X direction being different from and at an angle with respect to said Y direction;
said X direction and said Y direction being parallel to said first surface means and to said second surface means;
said first groove means and said second groove means respectively having overlying regions when said movable member is disposed for said movement relative to said fixed base;
X-Y guide means having a first half and a second half;
said first half being disposed in said first groove means for sliding, non-rotating relative movement therebetween in said X direction;
said second half being disposed in said second groove means for sliding, non-rotating relative movement therebetween in said Y direction;
said first half and said second half including portions thereof disposed within said overlying regions of said first and said second groove means;
said first groove means including at least one first groove;
said second groove means including at least one second groove;
said X-Y guide means including at least one X-Y guide element;
said at least one second groove having a second groove cross section which has a first width at said second surface means and a second width remote from said second surface;
said second width being greater than said first width;
said second half of said X-Y guide element having a guide cross section corresponding to said second groove cross section for retaining said second half within said second groove; and
force applying means for selectively applying a force to said X-Y guide element in a direction toward said fixed base to cause said second surface means to be forced toward said first surface means to maintain said movable member at a fixed position relative to said fixed base;
whereby, prior to said force applying means selectively applying said force to said X-Y guide element, said movable member is capable of movement in said X direction as said first half of said X-Y guide means moves in said X direction along said first groove means and in said Y direction as said second groove means moves in said Y direction on said second half of said X-Y guide means to allow movement of said movable member relative to said fixed base.

13. The X-Y movement mechanism according to claim 12, wherein said second groove cross section and said guide cross section are T-shaped.

14. The X-Y movement mechanism according to claim 12, wherein
said first surface means includes a first planar surface;
said second surface means includes a second planar surface;
said first planar surface and said second planar surface are in sliding contact throughout said movement of said movable member relative to said fixed base;
said first groove means, said second groove means, and said X-Y guide means are substantially confined between said fixed base and said movable member; and
said first planar surface and said second planar surface include regions of said sliding contact surrounding said first groove means, said second groove means and said X-Y guide means.

15. An X-Y movement mechanism comprising:
a fixed base having first surface means;
a movable member having second surface means;
said movable member being disposed for movement relative to said fixed base with said second surface means being parallel with and facing toward said first surface means;
said fixed base having a first groove in said first surface means extending in an X direction;
said movable member having a second groove in said second surface means extending in a Y direction;
said X direction being different from and at an angle with respect to said Y direction;
said X direction and said Y direction being parallel to said first surface means and to said second surface means;
said first groove and said second groove respectively having overlying regions when said movable member is disposed for said movement relative to said fixed base;
an X-Y guide element having a first half and a second half;
said first half being disposed in said first groove for sliding, non-rotating relative movement therebetween in said X direction;
said second half being disposed in said second groove for sliding, non-rotating relative movement therebetween in said Y direction;
said first half and said second half including portions thereof disposed within said overlying regions of said first and said second groove;
said movable member being capable of movement in said X direction as said first half of said X-Y guide moves in said X direction along said first groove;
said movable member being capable of movement in said Y direction as said second groove in said Y direction on said second half of said X-Y guide;
first adjusting means mounted on said fixed base and operably connected to said X-Y guide element for selectively moving said X-Y guide element in said X direction within said first groove; and second adjusting means mounted on said movable member and operably connected to said X-Y guide element for selectively moving said second groove in said Y direction relative to said X-Y guide element.

16. The X-Y movement mechanism according to claim 15, wherein said first adjusting means extends along said first groove and said second adjusting means extends along said second groove.

17. The X-Y movement mechanism according to claim 15, wherein
said first surface means includes a first planar surface;
said second surface means includes a second planar surface;
said first planar surface and said second planar surface are in sliding contact throughout said movement of said movable member relative to said fixed base;
said first groove, said second groove, and said X-Y guide element are substantially confined between said fixed base and said movable member; and
said first planar surface and said second planar surface include regions of said sliding contact surrounding said first groove, said second groove and said X-Y guide element.

18. The X-Y movement mechanism according to claim 15, wherein
said first surface means includes a first planar surface;
said second surface means includes a second planar surface;
said first planar surface and said second planar surface are in sliding contact throughout said movement of said movable member relative to said fixed base;
each of said first groove and said second groove has a groove cross section with a top adjacent said first and said second planar surfaces and a bottom remote therefrom,
said groove cross section has a top width at said top and a bottom width at said bottom,
said bottom width is greater than said top width, and
each of said first half and said second half of said X-Y guide element has a guide cross section generally corresponding to said groove cross section,
whereby said X-Y guide element being disposed within said first groove and said second groove tends to maintain said second planar surface in sliding contact with said first planar surface.

19. The X-Y movement mechanism according to claim 18, wherein said groove cross section and said guide cross section are trapezoidal.

20. The X-Y movement mechanism according to claim 15, wherein
said X-Y guide element includes said first half which is elongated in said X direction to extend along said first groove and said second half which is elongated in said Y direction to extend along said second groove and said first half and said second half are joined at said respective portions thereof which remain in alignment with said overlying regions of said first groove and said second groove throughout said movement of said movable member relative to said fixed base.

21. An X-Y movement mechanism comprising:
a fixed base having first surface means;
a movable member having second surface means;
said movable member being disposed for movement in an X direction and in a Y direction relative to said fixed base with said second surface means being parallel with and facing toward said first surface means;
said X direction and said Y direction being parallel to said first surface means and to said second surface means;
said X direction being different from and at an angle with respect to said Y direction;
said fixed base having a first X groove in said first surface means extending in said X direction;
said movable member having a first Y groove in said second surface means extending in said Y direction;
said first X groove and said first Y groove respectively having first overlying regions when said movable member is disposed for said movement relative to said fixed base;
a first X-Y guide element having a first X half and a first Y half;
said first X half of said first X-Y guide element being disposed in said first X groove for sliding relative movement therebetween in said X direction;
said first Y half of said first X-Y guide element being disposed in said first Y groove for sliding relative movement therebetween in said Y direction;
said first X half and said first Y half of said first X-Y guide element including portions thereof disposed within said first overlying regions of said first X groove and said first Y groove;
said fixed base having a second Y groove in said first surface means extending in said Y direction;
said movable member having a second X groove in said second surface means extending in said X direction;
said second Y groove and said second X groove respectively having second overlying regions when said movable member is disposed for said movement relative to said fixed base;
a second X-Y guide element having a second Y half and a second X half;
said second Y half of said second X-Y guide element being disposed in said second Y groove for sliding relative movement therebetween in said Y direction;
said second X half of said second X-Y guide element being disposed in said second X groove for sliding relative movement therebetween in said X direction; and
said second Y half and said second X half of said second X-Y guide element including portions thereof disposed within said second overlying regions of said second Y groove and said second X groove;
whereby said movable member is capable of movement in said X direction, as said first X half of said first X-Y guide element moves in said X direction along said first X groove and said second X groove moves in said X direction on said second X half of said second X-Y guide element, and in said Y direction, as said first Y groove moves in said Y direction on said first Y half of said first X-Y guide element and said second Y half of said second X-Y guide element moves in said Y direction along said second Y groove.

22. The X-Y movement mechanism according to claim 21, further including first adjusting means mounted on said base plate for selectively moving said first X-Y guide element in said X direction and second adjusting means mounted on said fixed base for selectively moving said second X-Y guide element in said Y direction.

23. The X-Y movement mechanism according to claim 21, further including first adjusting means mounted on said movable member for selectively moving said second X-Y guide element in said X direction and second adjusting means mounted on said movable member for selectively moving said first X-Y guide element in said Y direction.

24. The X-Y movement mechanism according to claim 21, wherein said first surface means includes a first planar surface;

said second surface means includes a second planar surface;

said first planar surface and said second planar surface are in sliding contact throughout said movement of said movable member relative to said fixed base;

said first groove means, said second groove means, and said X-Y guide means are substantially confined between said fixed base and said movable member; and said first planar surface and said second planar surface include regions of said sliding contact surrounding said first groove means, said second groove means and said X-Y guide means.

* * * * *